Jan. 6, 1925.　　　　　　　　　　　　　　　　1,522,157
J. J. TRACY ET AL
TRACKLAYING TRACTOR
Filed Dec. 6, 1923　　　　5 Sheets-Sheet 1

Jan. 6, 1925. 1,522,157

J. J. TRACY ET AL

TRACKLAYING TRACTOR

Filed Dec. 6, 1923 5 Sheets-Sheet 3

INVENTORS
James J. Tracy and
Arthur E. Palmer.
BY Fay, Oberlin & Fay
ATTORNEYS

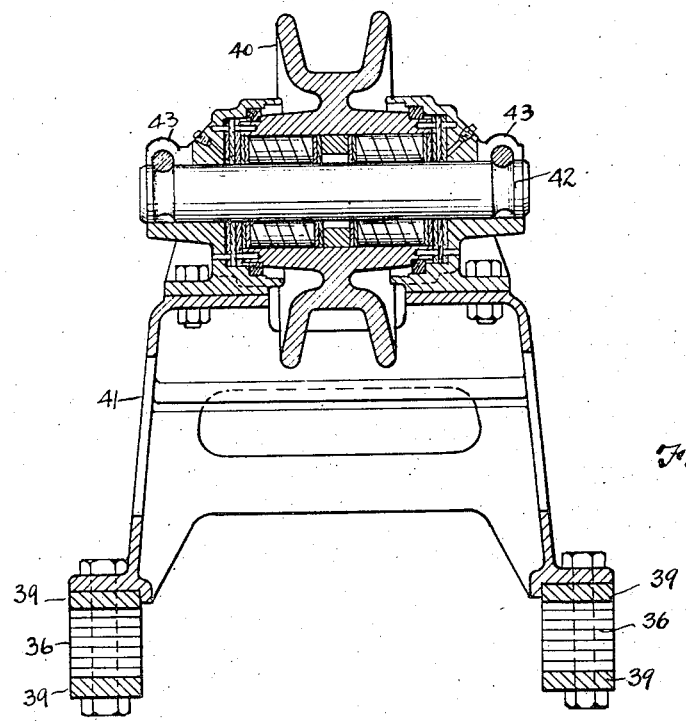
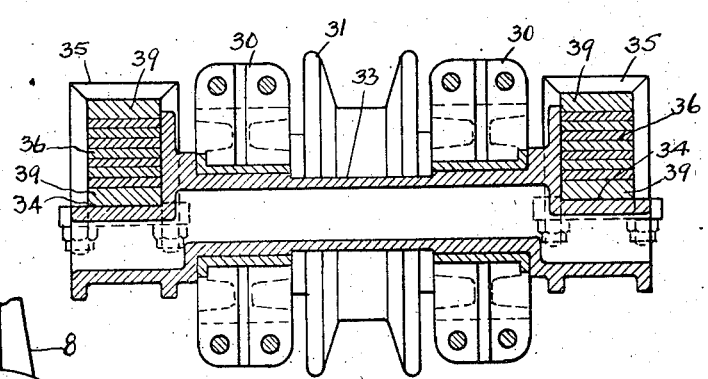
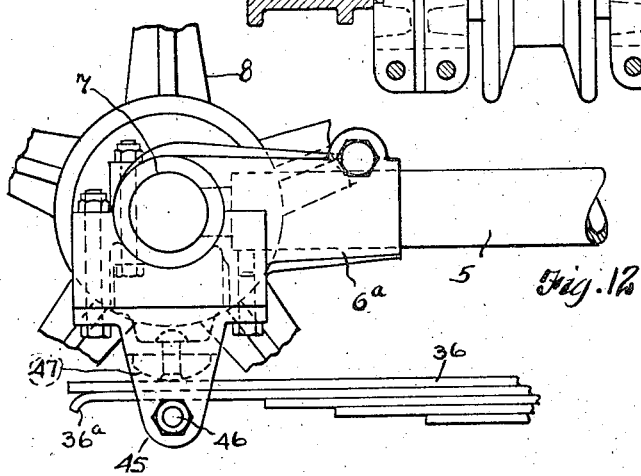

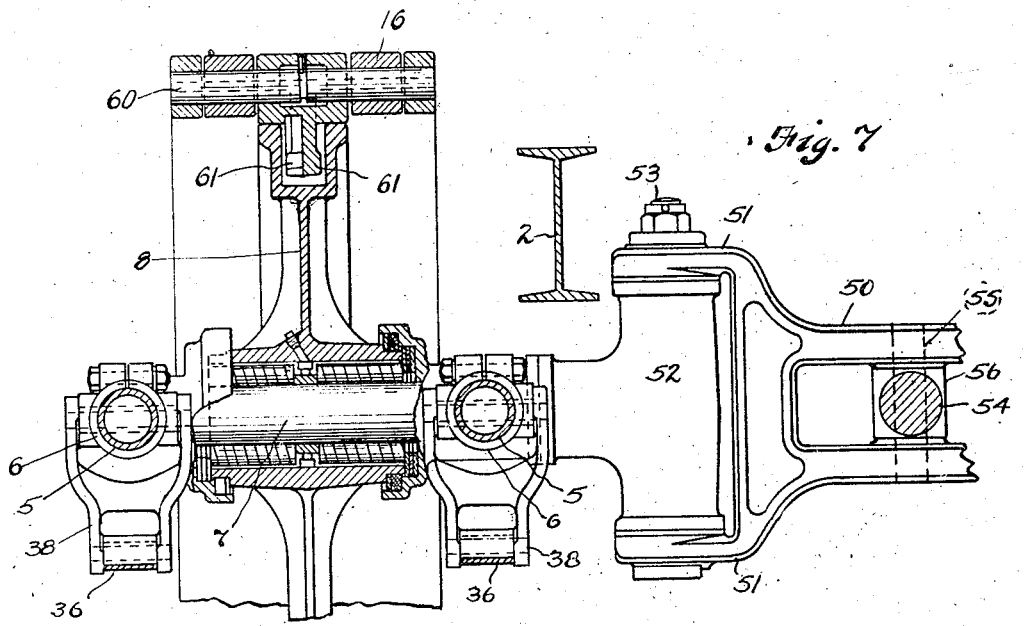
Fig. 7
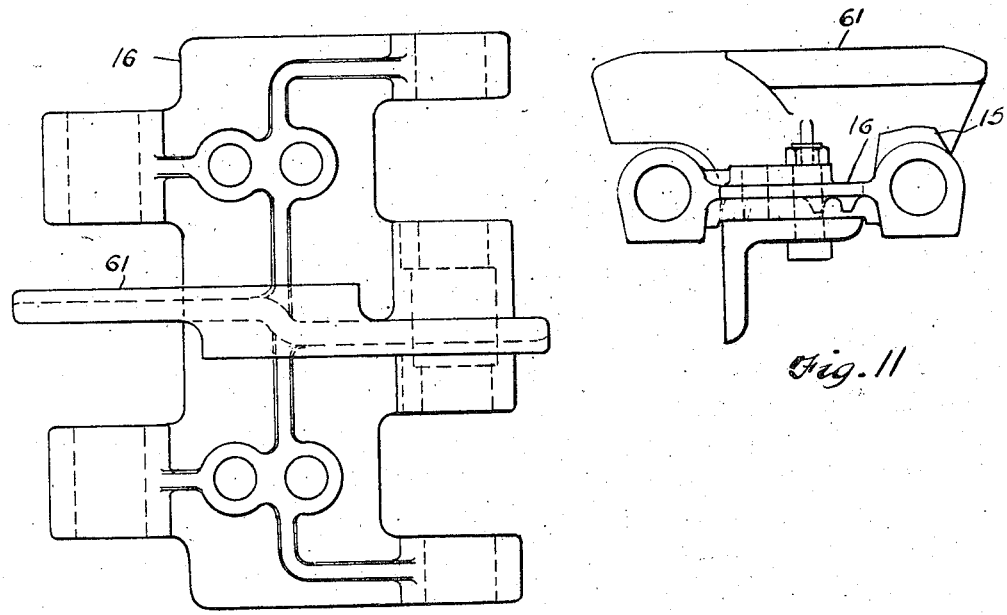
Fig. 10.
Fig. 11
INVENTORS
James J. Tracy and
BY Arthur E. Palmer
Fay, Oberlin & Fay
ATTORNEYS Patented Jan. 6, 1925.

1,522,157

UNITED STATES PATENT OFFICE.

JAMES J. TRACY, OF SHAKER VILLAGE, AND ARTHUR E. PALMER, OF EAST CLEVELAND, OHIO; SAID PALMER ASSIGNOR TO SAID TRACY.

TRACKLAYING TRACTOR.

Application filed December 6, 1923. Serial No. 678,858.

*To all whom it may concern:*

Be it known that we, JAMES J. TRACY and ARTHUR E. PALMER, both citizens of the United States, and residents of Shaker Village, county of Cuyahoga, and State of Ohio, and of East Cleveland, county of Cuyahoga, and State of Ohio, respectively, have jointly invented a new and useful Improvement in Tracklaying Tractors, of which the following is a specification, the principle of the invention being herein explained and the best mode in which we have contemplated applying that principle, so as to distinguish it from other inventions.

The present improvements, relating, as indicated, to a tractor of the track-laying type, also known as planking tread or portable track type, have more particular regard to the construction and manner of mounting of the traction members in such a tractor. Such traction member comprises, essentially, an endless jointed track that passes around two properly spaced wheels mounted in a suitable frame. The wheel to which power is applied is a sprocket wheel that is adapted to engage with the endless track to drive the same, while the other wheel is simply an idler.

One object of the present invention is to improve the construction of the frame itself so as to permit greater flexibility, while at the same time insuring adequate traction.

Another object is to secure greater flexibility in the connection between the frame and the forward end of the tractor frame proper. In connection with the foregoing various improvements of a more detailed character have been incorporated.

To the accomplishment of the foregoing and related ends the invention consists of the means hereinafter fully described and particularly pointed out in the claims, the annexed drawings and the following description setting forth in detail certain mechanism embodying the invention, such disclosed means constituting, however, but one of the various mechanical forms in which the principle of the invention may be used.

In said annexed drawings:—

Figure 1:
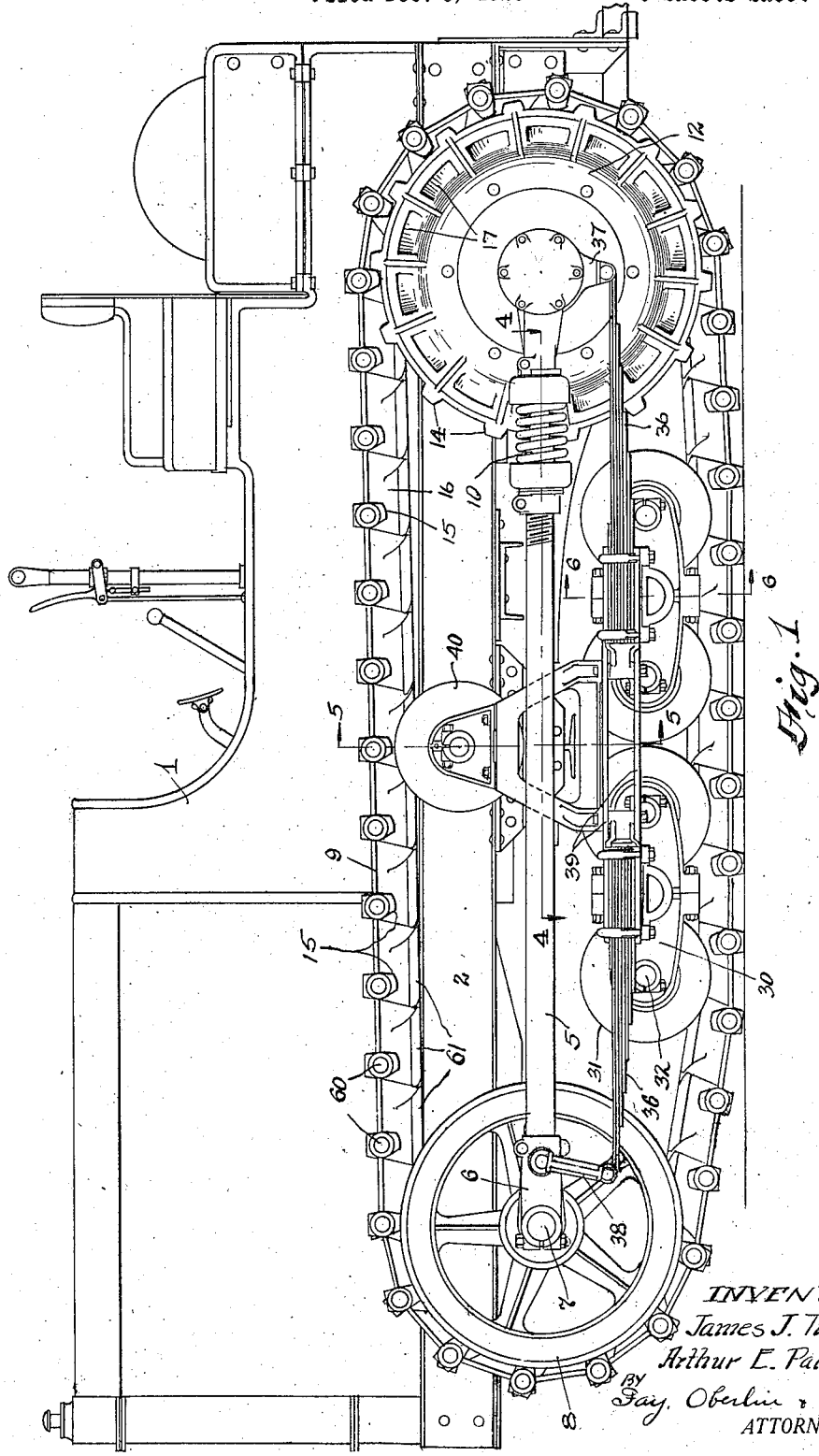
Figure 2:
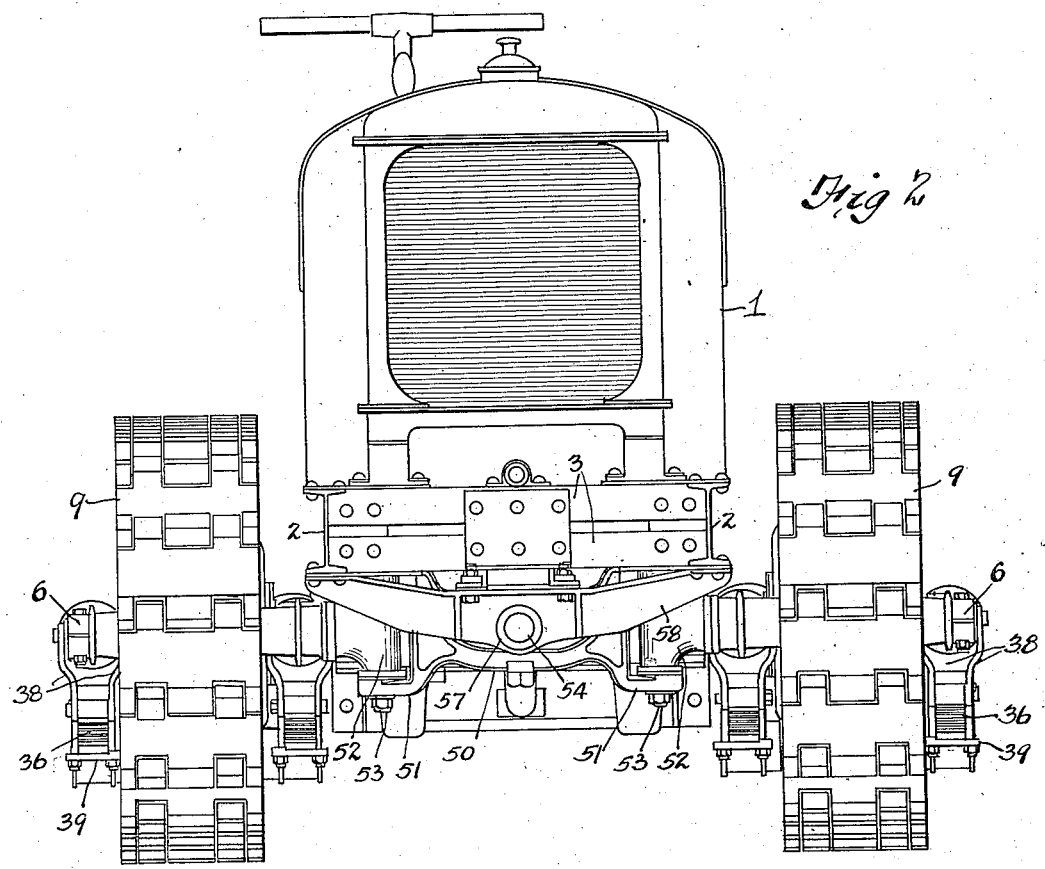
Figure 4:
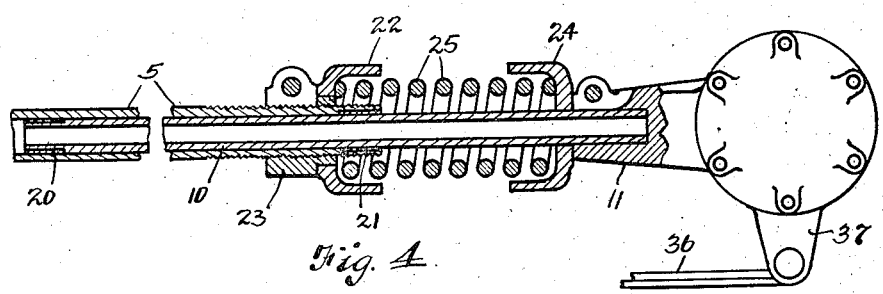
Figure 8:
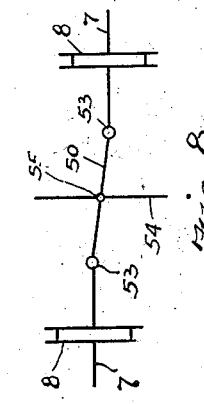
Figure 9:
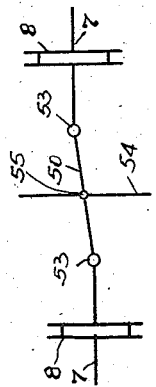
Figure 3:
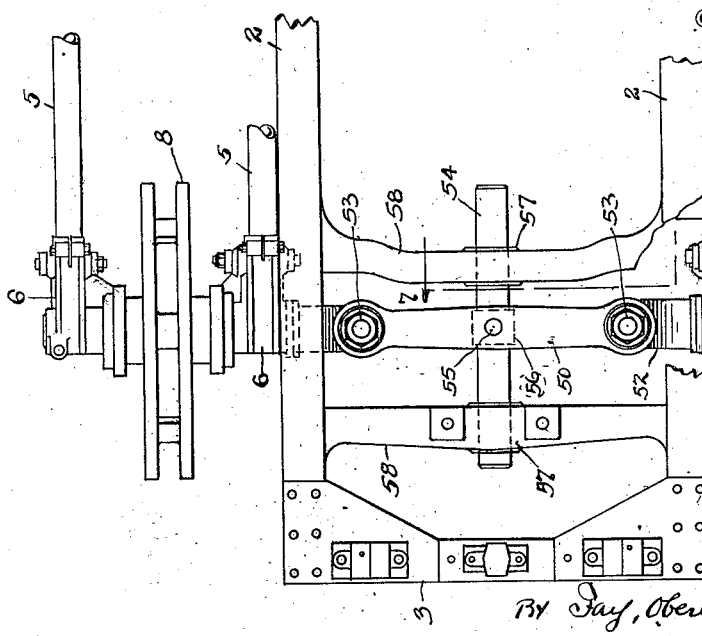

Fig. 1 is a side elevation of a tractor of the type in question, embodying our present improvements; Fig. 2 is a front elevation of the same; Fig. 3 is a broken plan view of the main frame of the tractor with a plan view of the frame of one of the tractor members, the latter being stripped of the endless track, and certain other parts; Fig. 4 is a vertical section of the detail of the traction member frame, the plane of the section being indicated by the line 4—4, Fig. 3; Fig. 5 is a transverse section of a roller support for the intermediate portion of the endless track, the plane of the section being indicated by the line 5—5, Fig. 1; Fig. 6 is a similar vertical section through one of the trucks that rest upon the opposite portion of such endless track, the plane of such section being indicated by the line 6—6, Figs. 1 and 3; Fig. 7 is a transverse section and rear elevation of the front axle, whereby the forward end of the main tractor frame is supported on the traction members on either side, the several planes of such section being indicated by the broken line 7—7, Fig. 3; Figs. 8 and 9 are diagrammatic plan views, illustrating in somewhat exaggerated manner the operation of such front axle; Fig. 10 is a plan view, and Fig. 11 a side elevation, of one of the component parts of the endless track; and Fig. 12 is a broken side elevation showing a modification in a detail of construction.

The main frame of the tractor, upon which is mounted the body 1, with power plants, transmission mechanism, etc., consists, as usual, of two parallel side members 2 of channel or I-beam cross-section and a number of transverse beams or bars 3, (see Figs. 1, 2 and 3). This frame, together with the mechanism thus carried thereby, is wholly supported upon two similar traction members, one on either side, such traction members being, as already indicated, of the endless or planking tread type. The steering of the tractor, it may be stated incidentally, is intended to be accomplished by varying the various rates at which these two traction members are driven.

Each traction member includes a frame, the principal elements of which are two parallel horizontally extending tubular bars 5. At their forward ends these bars are fixedly attached to suitable housings 6, wherein is secured in turn a transverse shaft 7. Upon this shaft is suitably journaled, (see Fig. 7) the idler wheel 8, about which passes the forward ends of the endless track 9. This wheel (as shown in Figs. 3 and 7), consists of two laterally spaced rim portions, the space between which is cored out or open save at points opposite the ends of the spokes, so that dirt will not accumulate between the endless track and such wheel and so clog operation of the latter.

Telescopically fitted within each tubular rod 5, and projecting beyond the rear end thereof, is a secondary rod 10, (see Fig. 4) of suitably reduced diameter, the rear end of such rod being fixedly secured in housings 11 that correspond with the housings 6, one such housing 11 being provided on each side of the rear or driving wheel 12. The manner in which this wheel is journaled on the tubular housing or fixed shaft 13, that projects laterally from the main frame of the tractor, forms no part of the present invention and so is not shown in detail. It will be understood that the housings 11 are oscillatory about the axis of said tubular shaft, upon which the wheel 12 is thus journaled. Such wheel 12, as previously explained, is a sprocket wheel, the two laterally spaced rim portions thereof being provided with suitable teeth 14 adapted to engage with inwardly directed lugs 15 on the successive sections 16 of the endless track 9, as will be presently more fully described. A series of lateral openings 17 are provided in the outer toothed rim portion of the wheel, one such opening being preferably provided, between each tooth 14, through which any dirt or equivalent obstructive material carried around by the track may drop or be forced, and clogging thus prevented.

The telescopic rod 10 is provided at its extremity with a bushing 20 of special bearing metal, and a bushing 21 is similarly fitted in the end of tubular rod 5. Sliding contact between the two rods is in effect limited to these two bushings, thus materially reducing friction. Adjustably secured to such end of tubular rod 5 is a cup-shaped collar 22, this collar being preferably held in selected place by means of a split clamp collar 23, that is threaded on said rod. A similar oppositely directed cup-shaped collar 24 is snugly fitted on the inner rod 10 adjacent the housing 11, and a stiff compression spring 25 is interposed between said two collars, the tendency of such spring being to force the two collars, and thus the shafts, apart. As a result it will be seen that any desired degree of tension may be imposed on the endless track 9 by properly adjusting the first-mentioned collar 22 on the rod 5.

The lower portion of the endless track lying between the idler wheel 8 and sprocket wheel 12 is depressed below a line tangent to said two wheels, and thus held in contact with the surface upon which the tractor is required to move, by means of two similar roller trucks 30, (see Figs. 1, 3 and 6).

Each such truck includes two peripherally flanged rollers 31, rotatably mounted on spindles 32, that are fixedly secured in the side frames of the truck. The latter are transversely split on a central vertical plane in order to permit them to be oscillatorily secured to a transverse tubular support 33. The form of such support 33 is best shown in Fig. 6, from which it will be seen that the respective ends thereof are offset downwardly and flattened on top so as to provide seats 34. To each such seat is secured, by means of the usual clips 35, a quarter elliptical leaf spring 36. These springs extend in opposite directions in the case of the two trucks, the outer ends of each of the two rear springs being pivotally attached to hangers 37 that project downwardly from the corresponding housings 11 on each side of the sprocket wheel 12. The front end of the two forwardly projecting springs 36 are, on the contrary, secured to the corresponding housings 6 on each side of idler wheel 8, by means of a link or shackle 38 that permits of relative movement in a longitudinal direction between the parts in question.

The two trucks 30 are furthermore rigidly connected together by means of a pair of bars 39 on each side, the ends of such bars overlapping the bases of the aligned pair of springs 36, and being clamped to seats 34 along with such spring bases by means of clips 35. The four aligned rollers 31, carried by the truck, it will thus be seen, ride on the lower ground surface contacting portion of the endless track 9 and are pressed uniformly against the same by the action of the springs 36. At the same time each truck 30, being free to oscillate about its tubular support 33 as a transverse axis, will permit the particular portion of such endless track wherewith the rollers of such truck contact, to flex sufficiently to pass over inequalities in such surface.

For the purpose of supporting the upper portion of endless track 9 intermediately of idler wheel 8 and sprocket wheel 12 we provide an idler roller 40 that is flanged just as are rollers 31, so as to engage with the inner side of the successive sections that compose such track. Roller 40, as best shown in Fig. 5, is mounted on a hollow frame or support 41, attached at its lower end to the aforesaid bars 39, that connect springs 36 and thereby the two trucks 30. Such bars 39 and frame 41 constitute in effect a unitary frame structure for the trucks just referred to and the idler roller 40. The latter is directly rotatably mounted on a spindle 42, fixedly held at its respective ends in boxes 43 mounted on the upper surface of the frame 41.

Instead of connecting the forward ends of springs 36 with the corresponding housings 6 through the medium of a link or shackle 38, as shown in Fig. 1, a sliding or rolling connection may be substituted. Thus in the modified construction shown in Fig. 12, the end of the spring is laterally held between two ears 45 that depend from housing 6ª directly below the spindle 7, and such spring end is vertically held between a transverse bolt 46 and convex bearing plate 47 secured to said ears. In order to prevent the end of the spring from being drawn entirely clear of the connection just described the extremity of one leaf is bent downwardly to provide a stop 36ª.

The manner in which the two spindles 7, that carry the front or idler wheels 6 of the respective traction members, are attached to the main frame of the tractor, will now be described. The front axle 50, (see Figs. 2, 3 and 7) takes the form of an open rectangular frame, the respective ends of which are provided with integral vertically spaced projecting arms 51. Between these the adjacent end 52 of the corresponding spindle 7 is pivotally secured by means of a pin 53, just as in the axle yoke of the ordinary fixed front axle of an ordinary motor vehicle. Fitted transversely of the opening in axle 50, and thus extending longitudinally of the main frame of the tractor, is a spindle 54, such spindle being oscillatorily secured to the frame, or rather, the frame being oscillatorily secured to it, by a vertical pin 55. This pin may be compared to a king pin in a vehicle of the horse-drawn type, and the adjacent portion 56 of spindle 54 is squared so as to present an adequate bearing surface for contact with the opposed inwardly directed faces of the axle frame 50. The respective ends of spindle 54 are longitudinally slidably, as well as oscillatorily, mounted in suitably aligned bearings 57 provided in two transverse frame members 58 that connect side members 2 of the main frame, one lying on each side of the axle frame 50.

As a result of the foregoing construction it will be seen that the axle frame 50 is free to oscillate with spindle 54, lying in the median plane of the vehicle, as also to oscillate about an axis, normally vertical, that passes transversely through such spindle 54, being defined by the pin 55. In addition, each of the spindles 7, that carry the respective front wheels 6 of the traction members, is of course free to turn about the normally vertical axes defined by pins 53 of the corresponding spindle yokes 51. An unusual degree of flexibility is accordingly permitted the front ends of the respective traction members. As illustrated diagrammatically in Figs. 8 and 9, either front wheel 8, due to compression of springs 25 in the frame of the corresponding traction member, may be forced back of the opposite front wheel, as by striking an obstruction, without twisting the spindle 7 of such wheel or placing any undue strain thereon. Such spindle, in other words, is at all times maintained in proper transverse alignment even though temporarily displaced out of alignment with the spindle of the opposite front wheel. It is also possible for the front wheel or forward end of one traction member to be displaced vertically without straining the front axle structure in any way, free movement of such axle in a transverse vertical plane being permitted about spindle 54. The frames of the traction members will likewise readily accommodate themselves to this sort of displacement, since use of the telescoping rods 5 and 10 not only permits the frames to vary in length, but permits the rods to twist or turn about the inner rods and thus allows for a certain amount of weaving in such traction member frames.

The construction of the endless tracks 9 that pass around the wheels 8 and 12 of the respective traction members is of secondary interest, but will be found illustrated in Figs. 10 and 11, (see also Fig. 7 where such track is shown in transverse section). As previously indicated, the track is made up of pivotally connected sections 16, the inwardly directed faces of which are as shown in Fig. 10. Each such plate, in other words, is formed with a central longitudinally projecting rib 61 composed of two slightly offset portions so that the rib on one section may overlap the rib on the other and form a continuous rib fitted to the space between the flanged portions of idler 8 and sprocket wheel 12. On the same face each plate is provided, adjacent its one end, with paired teeth 15 transversely disposed for engagement with the teeth 14 of said sprocket wheel. The sections are pivotally or hingedly secured by means of transverse pins 60, as will be readily understood. As shown in Fig. 1, the length of the sections 16 of the track, and thus the spacing of the teeth 15 and pins 60 on such sections, is such that in the initial or unworn condition of these teeth, and of the teeth 14 on the sprocket wheel 12, only the uppermost of said teeth 14 will have driving engagement with the track. However, as the teeth wear away additional teeth on the chain and sprocket wheel will successively be thus brought into engagement until finally such engagement will occur throughout the maximum extent of the track's contact with the sprocket wheel.

The two pairs of oppositely directed leaf springs 36, that form a feature of each of the supplemental frames whereon the endless tracks are carried, perform the important function of relieving the main frame, and thus the power plant and transmission mechanism of the tractor, from shocks and jars. The tractor, in other words, is normally carried on those sections of the lower portions of the respective tracks against which the two connected roller trucks are pressed by said springs 36. The resilient pressure exerted by the latter has a further important function in that it serves at all times to hold this portion of the track taut. Accordingly there is no danger of such track portion dropping free of the truck rollers and becoming disengaged therefrom, as is otherwise apt to happen where the traction member is supported at its ends only,—for example, in crossing a ditch or the like.

One function of the springs 25 that normally resist contraction of the telescopic side members of the respective supplemental frames, as previously explained, is to permit the front or idler wheel to be forced backwardly as is possible by reason of the form of connection between the spindle of such wheel and the front axle and the novel method of mounting the latter in the main frame of the tractor. As a matter of fact, the occasion for such retraction of the idler wheel in question will ordinarily arise when a rock or like hard obstruction is carried through between the rear or driving wheel and the track. The amount of play permitted the latter by the springs 36 is not sufficient to avoid damage to the track under the circumstances noted, but in such case the compression of springs 25, by permitting a corresponding longitudinal contraction of the supplemental frame, will allow the obstruction to pass through.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a second wheel carried in the free end of each supplemental frame; an endless track passing around the two wheels associated with each supplemental frame; and connections between the wheel in the free end of each frame and the main frame, whereby such wheel may shift its position longitudinally of said main frame.

2. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a second wheel carried in the free end of each supplemental frame; an endless track passing around the two wheels associated with each supplemental frame; and connections between the wheel in the free end of each frame and the main frame, whereby such wheel may shift its position longitudinally of said main frame and also oscillate about a median line in said main frame as an axis.

3. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; and a transverse axle in said main frame connected at each end by a vertical pivotal joint with the spindle in the corresponding supplemental frame, said axle being oscillatory in said main frame about a vertical axis.

4. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; and a transverse axle in said main frame connected at each end by a vertical pivotal joint with the spindle in the corresponding supplemental frame, said axle being oscillatory in said main frame about intersecting vertical and longitudinal axes.

5. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; and a transverse axle in said main frame connected at each end by a vertical pivotal joint with the spindle in the corresponding supplemental frame, said axle being oscillatory in said main frame about a vertical axis and said axle being also bodily displaceable longitudinally of said main frame.

6. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; and a transverse axle in said main frame connected at each end by a vertical pivotal joint with the spindle in the corresponding supplemental frame, said axle being oscillatory in said main frame about intersecting vertical and longitudinal axes and said axle being also bodily displaceable longitudinally of said main frame.

7. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; a member oscillatory about a median line in said main frame; and a transverse axle secured to said member so as to be oscillatory about a normal vertical axis, said axle being connected at each end by a vertical pivotal joint with the spindle in the corresponding side frame.

8. In a tractor of the track-laying type, the combination of a main frame, two axially aligned driving wheels, one on each side of said main frame; two supplemental frames, one on each side of said main frame secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; a member oscillatory about a median line in said main frame, said member being also bodily displaceable longitudinally of said main frame; and a transverse axle secured to said member so as to be oscillatory about a normal vertical axis, said axle being connected at each end by a vertical pivotal joint with the spindle in the corresponding side frame.

9. In a tractor of the track-laying type, the combination of a main frame, two axially aligned driving wheels, one on each side of said main frame; two supplemental frames, on each side of said main frame, secured at one end to the latter so as to be oscillatory about the common axis of said driving wheels; a transverse spindle in the free end of each supplemental frame; idler wheels mounted on said spindles, respectively; an endless track passing around the two wheels associated with each supplemental frame; a member oscillatory about a median line in said main frame, said member being also bodily displaceable longitudinally of said main frame and having a squared central portion; and a transverse axle in the form of an open rectangular frame surrounding the squared portion of said member and oscillatorily secured thereto, said axle being connected at each end by a vertical pivotal joint with the spindle in the corresponding side frame.

10. In a tractor of the track-laying type, the combination of a main frame; a driving wheel mounted thereon; a supplemental frame oscillatory about the axis of said driving wheel, said frame being longitudinally extensible and contractible, an idler wheel in the free end of said frame; an endless track passing around said two wheels; and means resisting contraction of said frame.

11. In a tractor of the track-laying type, the combination of a main frame; a driving wheel mounted thereon; a supplemental frame oscillatory about the axis of said driving wheel, said frame being longitudinally extensible and contractible, an idler wheel in the free end of said frame; an endless track passing around said two wheels; and compression springs resisting contraction of said frame.

12. In a tractor of the track-laying type, the combination of a main frame; a driving wheel mounted thereon; a supplemental frame oscillatory about the axis of said driving wheel, said frame including two parallel, longitudinally extensible and contractible side-members and means resisting contraction of said members; a transverse spindle attached to the free ends of said members; an idler wheel mounted on said spindle; and an endless track passing around said driving and idler wheels.

13. In a tractor of the track-laying type, the combination of a main frame; a driving wheel mounted thereon; a supplemental frame oscillatory about the axis of said driving wheel, said frame including two parallel, telescopic members and compression springs resisting contractive movement of said members; a transverse spindle attached to the free ends of said members; an idler wheel mounted on said spindle; and an endless track passing around said driving and idler wheels.

14. In a tractor of the track-laying type, the combination of a main frame; a driving wheel mounted thereon; a supplemental frame oscillatory about the axis of said driving wheel, said frame including two parallel members; a transverse spindle attached to the free ends of said members; an idler wheel mounted on said spindle; an endless track passing around said driving and idler wheels; a truck resting on the lower portion of said track between said wheels; and two quarter elliptic leaf springs attached at their bases to said truck and at their respective ends to the corresponding ends of said supplemental frame members.

15. In a tractor of the track-laying type, the combination of a main frame; a driving wheel mounted thereon; a supplemental frame oscillatory about the axis of said driving wheel, said frame including two parallel members; a transverse spindle attached to the free ends of said members; an idler wheel mounted on said spindle; an endless track passing around said driving and idler wheels; a truck resting on the lower portion of said track between said wheels; and two quarter elliptic leaf springs attached at their bases to said truck and at their respective ends to the corresponding ends of said supplemental frame members, said truck being oscillatory relatively to said springs about a transverse axis.

16. In a tractor of the track-laying type, the combination of a main frame; a driving wheel mounted thereon; a supplemental frame oscillatory about the axis of said driving wheel, said frame including two parallel members; a transverse spindle attached to the free ends of said members; an idler wheel mounted on said spindle; an endless track passing around said driving and idler wheel; two aligned trucks each provided with two aligned wheels disposed to rest on the lower portion of said track between said wheels; bars connecting said trucks; and quarter elliptic leaf springs attached at their bases to the adjacent one of said trucks and at their respective ends to the corresponding ends of said supplemental frame members.

17. In a tractor of the track-laying type, the combination of a main frame; a driving wheel mounted thereon; a supplemental frame oscillatory about the axis of said driving wheel, said frame including two parallel members; a transverse spindle attached to the free ends of said members; an idler wheel mounted on said spindle; an endless track passing around said driving and idler wheels; two aligned trucks each provided with two aligned wheels disposed to rest on the lower portion of said track between said wheels; bars connecting said trucks; quarter elliptic leaf springs attached at their bases to the adjacent one of said trucks and at their respective ends to the corresponding ends of said supplemental frame members; and another wheel carried by said bars and disposed to contact with the upper portion of said track.

18. In a tractor of the track-laying type, the combination of a main frame; a driving wheel mounted thereon; a supplemental frame oscillatory about the axis of said driving wheel, said frame including two parallel, longitudinally extensible and contractible side-members and means resisting contraction of said members; a transverse spindle attached to the free ends of said members; an idler wheel mounted on said spindle; an endless track passing around said driving and idler wheels; a truck resting on the lower portion of said track between said wheels; and two quarter elliptic leaf springs attached at their bases to said truck and at their respective ends to the corresponding ends of said supplemental frame members.

19. In a tractor of the track-laying type, the combination of a main frame; a driving wheel mounted thereon; a supplemental frame oscillatory about the axis of said drving wheel, said frame including two parallel, longitudinally extensible and contractible side-members and means resisting contraction of said members; a transverse spindle attached to the free ends of said members; an idler wheel mounted on said spindle; an endless track passing around said driving and idler wheels; a truck resting on the lower portion of said track between said wheels; and two quarter elliptic leaf springs attached at their bases to said truck and at their respective ends to the corresponding ends of said supplemental frame members, said truck being oscillatory relatively to said springs about a transverse axis.

20. In a tractor of the track-laying type, the combination of a main frame; two axially aligned driving wheels, one on each side of said main frame; two supplemental frames, one on each side of said main frame, secured at one end to the latter so as to be oscillatory about the common axis of said driving wheels, said supplemental frames being longitudinally extensible and contractible; means resisting the contraction of said supplemental frames; a transverse spindle in the free end of each such frame; an idle wheel mounted on said spindle; an endless track passing around said driving and idler wheels; and connections between each of said spindles and the main frame, whereby said spindles may shift their positions longitudinally of said main frame.

21. In a tractor of the track-laying type, the combination of a main frame; two axially aligned driving wheels, one on each side of said main frame; two supplemental frames, one each side of said main frame, secured at one end to the latter so as to be oscillatory about the common axis of said driving wheels, said supplemental frames being longitudinally extensible and contractible; means resisting the contraction of said supplemental frames; a transverse spindle in the free end of each such frame; an idler wheel mounted on said spindle; an endless track passing around said driving and idler wheels; and connections between each of said spindles and the main frame, whereby said spindles may shift their positions longitudinally of said main frame and also oscillate about a median line in said main frame as an axis.

Signed by us, this 4th day of December, 1923.

JAMES J. TRACY.
ARTHUR E. PALMER.